July 19, 1949.  E. O. MUELLER  2,476,892
TWIN-MOTOR BEARING HOUSING CONSTRUCTION
Filed Oct. 24, 1945
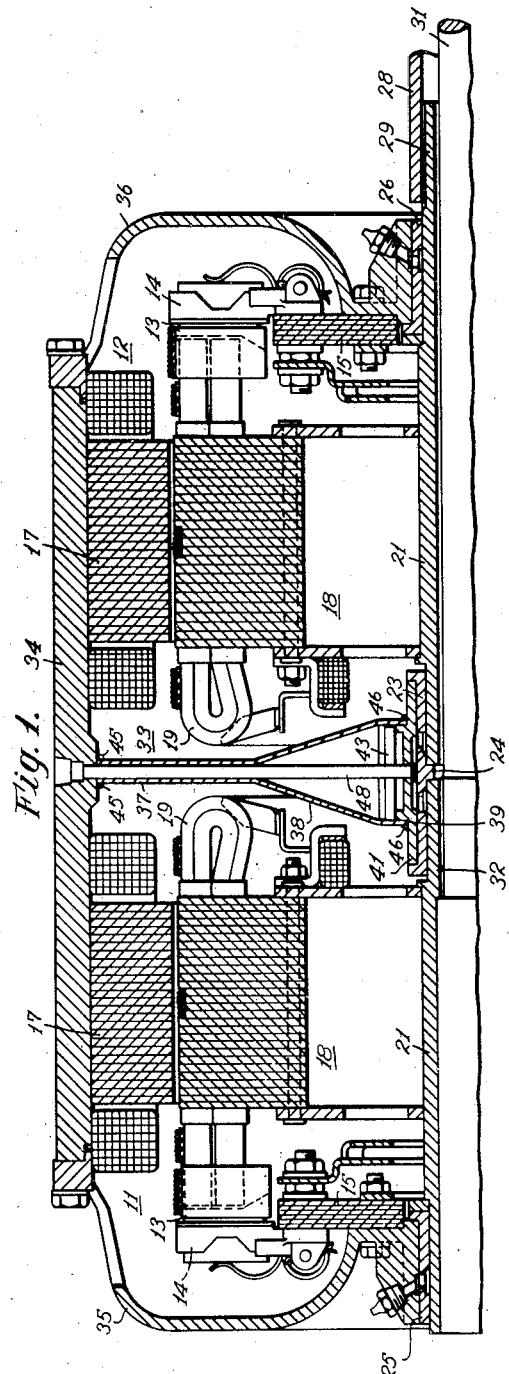
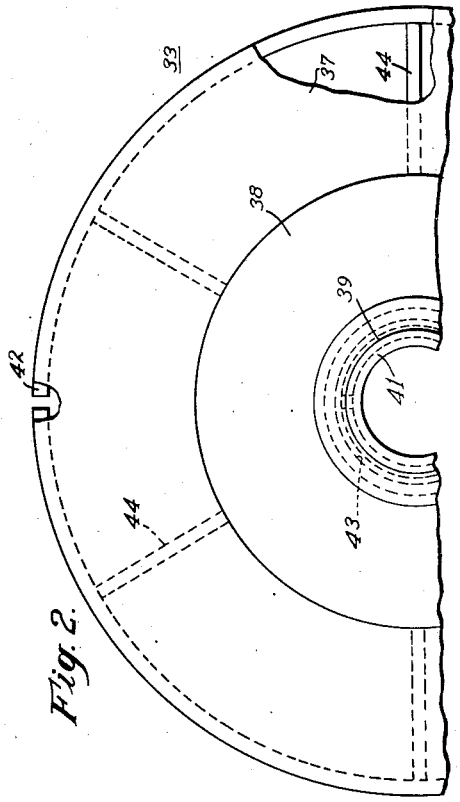
WITNESSES:
Edward Michaels
INVENTOR
Erich O. Mueller.
BY O. B. Buchanan
ATTORNEY Patented July 19, 1949

2,476,892

UNITED STATES PATENT OFFICE 2,476,892

TWIN-MOTOR BEARING HOUSING CONSTRUCTION

Erich O. Mueller, Irwin, Pa., assignor to Westinghouse Electric Corporation, East Pittsburgh, Pa., a corporation of Pennsylvania Application October 24, 1945, Serial No. 624,289

4 Claims. (Cl. 172—36)

My present invention relates to a light-weight bearing-housing which is made from reinforced sheet-metal for achieving light weight and rigidity, together with the minimum space-requirements, for supporting the central bearing of a twin-motor unit or other assemblage consisting of two coaxial machines having hollow shafts rotating in opposite directions.

The object of the invention is to provide a novel bearing-housing construction which combines light weight with extreme rigidity and minimum space-requirements.

An exemplary form of embodiment of my invention is shown in the drawing, wherein Figure 1 is a longitudinal sectional view of the top half of a twin-motor unit embodying my invention, and Fig. 2 is an end view of the top half of the central bearing-housing.

My invention is illustrated, in the drawing, in the form of a double electric-motor driving means, for use in driving two propeller-shafts in opposite directions, or for any other purposes. I have shown two identical electric motors 11 and 12, which are mounted coaxially, and which are disposed in back-to-back arrangement, so that the motors rotate in opposite directions, although they are identical in construction, thus saving motor-costs by making them identical.

I have chosen, for illustration, direct-current motors of a type having radial commutators 13, and radially disposed brushholders 14 which are carried by brushholder-supporting rings 15, as described and claimed in a patent-application of R. E. Rambo and C. F. Jenkins, Serial No. 624,287, filed October 24, 1945, now Patent No. 2,456,993, issued December 21, 1948, and assigned to the Westinghouse Electric Corporation. However, it is to be understood that any desired types of motors might be utilized, or, for that matter, any two axially aligned machines having rotating motions in opposite directions.

Each motor 11 and 12 consists of a stator member 17 and a rotor member 18, the latter having a commutator-type armature-winding 19, which is associated with the previously mentioned radial commutator 13. The rotor member 18 of each machine is provided with a hollow shaft 21.

A common centrally disposed bearing 23 is provided, for journalling the inner ends of both of the hollow shafts 21, and for providing a thrust-bearing 24 for engaging the inner ends of both of said hollow shafts. A separate outer journal bearing is provided for the outer end of each of the hollow shafts 21, as shown at 25 and 26.

The driven apparatus (not shown), which is driven by the right-hand motor 12, is driven by an extension of the hollow shaft 21 of that motor, this shaft-extension being illustrated in the form of a separate hollow shaft 28, which is splined at 29 to the outer periphery of the hollow shaft 21 of said right-hand motor. The driven apparatus (not shown), which is driven by the left-hand motor 11, is driven by means of an inner shaft 31, which extends through the hollow shaft-extension 28 and the hollow shaft 21 of the right-hand motor, and which is splined at 32, to the inside of the hollow shaft 21 of the left-hand motor.

A rigid supporting-means is provided, for supporting the two stator members 17 and the three bearings 23, 25 and 26. The drawing shows a special form of central-bearings housing or support 33, which constitutes the special subject-matter of my present invention. The general supporting-means comprises a hollow, double-motor frame 34, which extends over the stator members 17 of both machines. Before the stator members 17 are assembled within the hollow frame 34, the central bearing-housing 33 is secured centrally within said hollow frame. This central bearing-housing supports the central bearing 23. The two outer bearings 25 and 26 are carried by two end-brackets 35 and 36, respectively, which are carried by the hollow frame 34.

The central bearing-housing 33 has a special construction, which is designed for light weight and rigidity, in a space requiring the smallest possible axial length of the double-motor unit. In accordance with my present invention, it comprises two closely spaced discs 37 which are outwardly dished, near the center, as indicated at 38, the centers of the two discs being bored, as indicated at 39, to receive the hub 41 of the centrally disposed bearing 23.

As shown in Fig. 2, the two discs 37 are separated by various spacer-means, illustrated in the form on an outer spacer-ring 42, an inner spacer-ring 43, and a plurality of radial spacer-ribs 44, thus leaving most of the space between the discs 37 hollow. These parts are all suitably secured together at various radially displaced points, so that the spacer-ribs 44 serve as strengthening braces between the two discs 37.

The outer periphery of the central bearing-housing 33 is suitably secured within a central portion of the hollow frame 34, as by welding, as shown at 45. Suitable means are also provided for securing the bores 39 of the two discs 37 to the hub 41 of the centrally disposed bearing 23, as indicated by the welding 46.

The center bearing 23 is lubricated through a pipe 48 which extends from the bearing-hub 41 to the outer periphery of the discs 37, and preferably into or through the outer frame-housing 34, so that the top of the lubricating pipe 48 is accessible at the top of the twin-motor assembly.

From the foregoing explanation, it will be apparent that the central bearing-housing 33 is sufficiently rigid to stand re-machining, without springing, after its assembly within the dual-motor housing 34. This makes it possible to accurately maintain the bearing-alignment of the three bearings 23, 25 and 26 in the process of manufacture. The dishing of the inner peripheries of the discs 37, as shown at 38, provides a hollow-disc construction of maximum longitudinal rigidity, at the lightest possible weight, and utilizing the smallest possible spacing between the discs 34 at the undished portions thereof, so as not to extend the overall length of the twin-motor unit. The longitudinal rigidity of the hollow dished construction 38 makes it possible for the shafts 28 and 31 to withstand momentary (or permanent) heavy thrust-loads, which may be applied through the shafts in an axial direction, against the thrust-bearing part 24 of the central bearing 23. It will thus be apparent that I have provided a hollow-disc construction of maximum rigidity, for a minimum of weight and cost.

I claim as my invention:

1. A combination comprising two axially aligned machines, each machine having a stator member and a rotor member, each rotor member having a hollow shaft, the two rotor members rotating in opposite directions, a centrally disposed bearing for journalling the inner ends of both of said hollow shafts and for providing thrust-bearing support for both of said inner ends, a separate outer journal bearing for the outer end of each of said hollow shafts, an inner shaft extending through one of said hollow shafts and having a drive-connection to the inside of the other hollow shaft, a stationary hollow frame extending over the stator members of both machines, a central bearing-housing for supporting the centrally disposed bearing, and two end-brackets carried by the hollow frame and supporting the respective outer journal bearings, said central bearing-housing comprising two closely spaced discs which are outwardly dished near the center, the centers of the two discs being bored to receive the hub of the centrally disposed bearing, spacer-means secured at various radially displaced points to the discs for serving as strengthening braces therebetween, leaving most of the space between the discs hollow, means for securing the outer periphery of the central bearing-housing within the center of the hollow frame, and means for securing the two discs at their bores to the hub of the centrally disposed bearing.

2. A bearing-housing and bearing, comprising a bearing-hub, two closely spaced discs which are outwardly dished near the center, the centers of the two discs being bored to receive the hub, spacer-means secured at various radially displaced points to the discs for serving as strengthening braces therebetween, leaving most of the space between the discs hollow, a stationary cylindrical supporting-means for the outer peripheries of the two discs, and means for securing the two discs at their bores, to the hub of the bearing.

3. The invention as defined in claim 1, in combination with a lubricating pipe extending from the hub to the outer periphery of the discs, within the space between the discs.

4. The invention as defined in claim 2, in combination with a lubricating pipe extending from the hub to the outer periphery of the discs, within the space between the discs.

ERICH O. MUELLER.

REFERENCES CITED

The following references are of record in the file of this patent:

UNITED STATES PATENTS

| Number | Name | Date |
| --- | --- | --- |
| 740,945 | Taplin | Oct. 6, 1903 |
| 938,911 | Taylor | Nov. 2, 1909 |
| 1,586,184 | Dick et al. | Apr. 17, 1924 |
| 1,686,509 | Barber | Oct. 9, 1928 |
| 2,315,467 | Wahlberg | Mar. 30, 1943 |